Figure 1A:
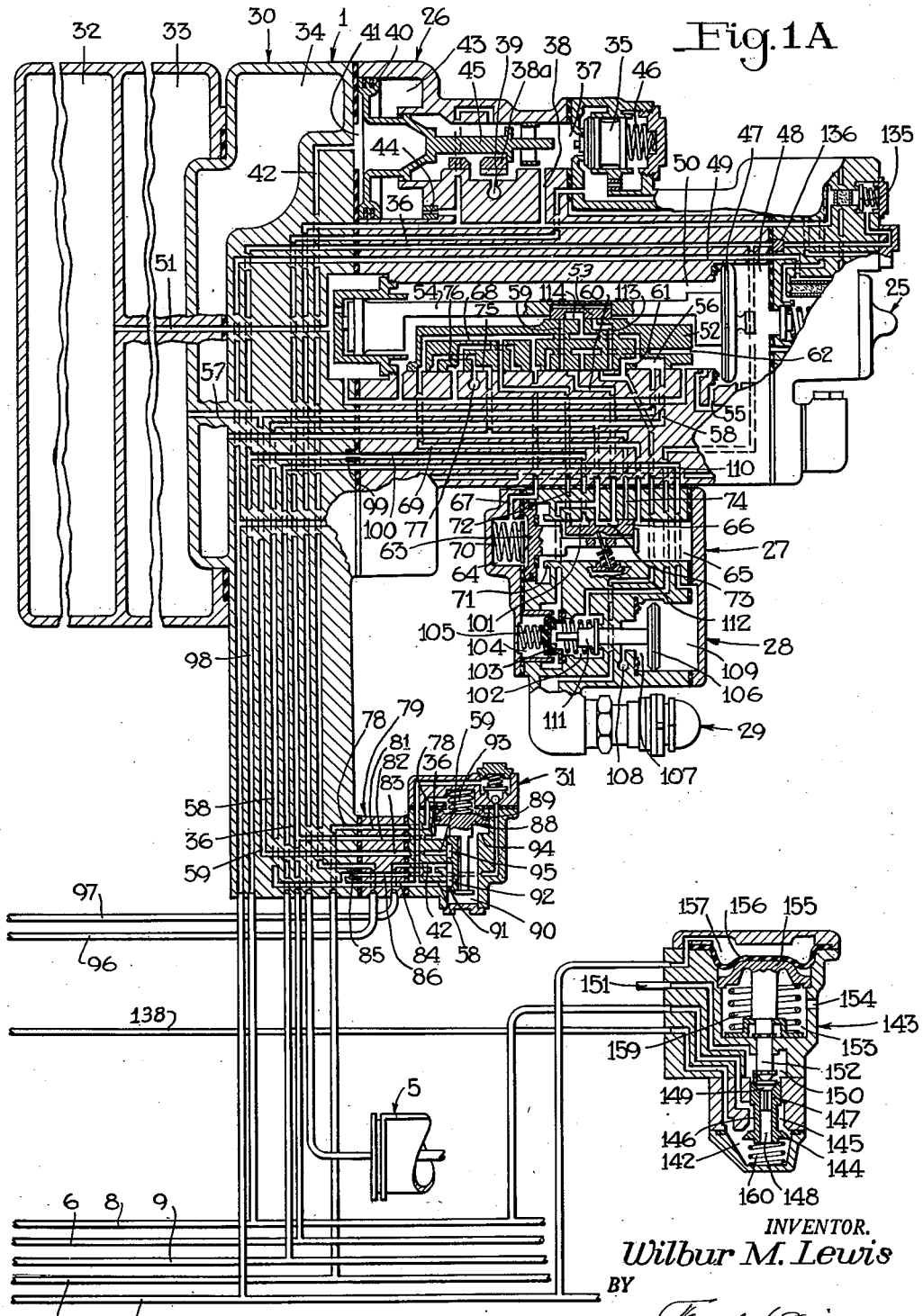

Feb. 26, 1952 W. M. LEWIS 2,587,051
FLUID PRESSURE BRAKE EQUIPMENT
Filed Sept. 23, 1949 2 SHEETS—SHEET 1
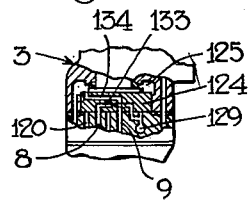
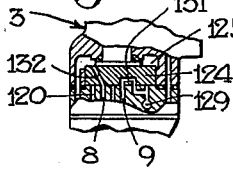
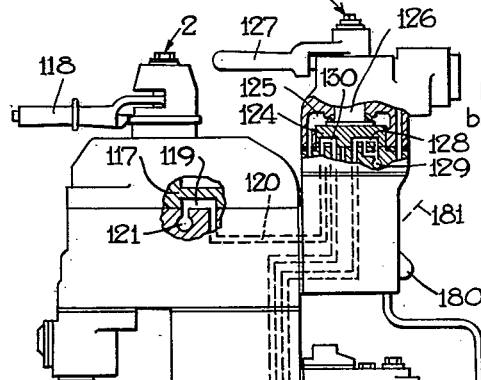
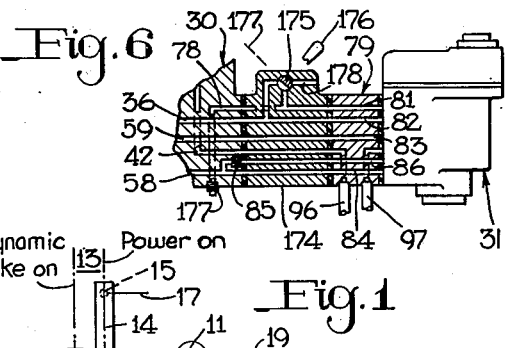
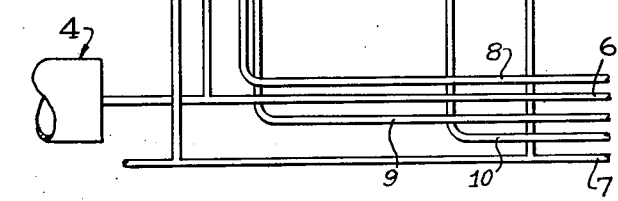
INVENTOR.
*Wilbur M. Lewis*
BY
*Frank E. Miller*
ATTORNEY Patented Feb. 26, 1952

2,587,051

UNITED STATES PATENT OFFICE 2,587,051

FLUID PRESSURE BRAKE EQUIPMENT

Wilbur M. Lewis, East McKeesport, Pa., assignor to Westinghouse Air Brake Company, a corporation of Pennsylvania Application September 23, 1949, Serial No. 117,328

7 Claims. (Cl. 303—3)

This invention relates to brake apparatus and more particularly to brake apparatus for a locomotive of the electrically propelled type.

Certain electric locomotives are equipped with Westinghouse Air Brake Company's No. 8EL locomotive brake equipment for braking the locomotive pneumatically and the electric propulsion motors on the locomotive are arranged to operate as generators for supplying electric current to a dynamic brake resistor for providing electric braking.

The No. 8EL locomotive brake equipment comprises a distributing valve device and an engineer's brake valve device consisting of an automatic portion and an independent portion. The automatic portion is provided for reducing pressure of fluid in the usual brake pipe to cause operation of the distributing valve device on the locomotive and of triple valves or the like on the cars of the train for effecting an automatic application of the fluid pressure brakes thereon, while the independent portion is provided to effect operation of the distributing valve device to apply and release the fluid pressure brakes of the locomotive independently of the brakes on the cars of the train. If both the fluid pressure brakes and the electric brakes on the locomotive are effective at the same time, slipping and undesired wear of the locomotive wheels may occur but under certain conditions it is desirable to be able to apply the fluid pressure brakes on the locomotive when the electric brakes are effective.

The principal object of the invention is therefore the provision of an improved locomotive brake equipment embodying both fluid pressure and electric braking means, and interlock means automatically operative when the electric braking means is effective to prevent an automatic application of the fluid pressure brakes on the locomotive but which permits control of the fluid pressure brakes on the locomotive by operation of the independent portion of the engineer's brake valve device when the electric brakes are effective.

Other objects and advantages will become apparent from the following more detailed description of the invention.

In the accompanying drawings: Figs. 1, 1a, when the right-hand edge of Fig. 1 is matched to the left-hand edge of 1a, is a diagrammatic view, partly in section and partly in outline, of a combined fluid pressure and electric brake equipment for a locomotive; Figs. 2 and 3 are sectional views of a portion of an independent brake valve device shown in Fig. 1 but with the rotary valve thereof in different positions; Fig. 4 is a sectional view of a portion of an automatic brake valve device shown in Fig. 1 but with the rotary valve thereof in a different position; Fig. 5 is a sectional view of a portion of a distributing valve device shown in Fig. 1a but with the parts in a different position; and Fig. 6 is a diagrammatic view of a different application of the invention than shown in Fig. 1a.

Description

As shown in the drawing, the fluid pressure brake equipment for the locomotive comprises a distributing valve device 1, an engineer's brake valve device comprising an automatic brake valve device 2 and an independent brake valve device 3, a main reservoir 4 and a brake cylinder device 5. The fluid pressure brake equipment further comprises a main reservoir pipe 6, a brake pipe 7, an independent application pipe 8, an independent release pipe 9 and a controlled emergency pipe 10, all of which pipes are connected to the distributing valve device 1 and to the engineer's brake valve device, the brake pipe 7 also extending to opposite ends of the locomotive for connection with a brake pipe of a train. In case the locomotive is of the multiple unit type all of the pipes just mentioned will extend through the several units with the exception of the controlled emergency pipe 10 which in some cases is present only on the leading unit.

The electric brake apparatus for the locomotive, may for illustration, comprise a propulsion motor 11 adapted to be operated as a generator for supplying electric current to a dynamic brake resistor 12 for providing a decelerating force for braking purposes. The reference numeral 13 designates an engineer's controller which may have a power-on position and a dynamic brake-on position as indicated in the drawing by suitable legends. In the power-on position a contact 14 in the controller is adapted to bridge a pair of contacts 15 and 16 for completing a circuit for supplying electric current to the motor 11, said circuit being, by way of example, from a power supply conductor 17 supplied with current from a suitable source such as a generator (not shown), the contact 14, a conductor 18, motor 11 and a grounded conductor 19. In the dynamic brake-on position a contact 20 is adapted to bridge contacts 16 and 21 for placing motor 11 in a dynamic brake circuit including the resistor 12 which is effective to produce dynamic braking upon operation of said motor as a generator, in a well-known manner.

The distributing valve device 1, the engineer's brake valve device including the automatic brake valve device 2 and the independent brake valve 3 and other parts of the fluid pressure brake equipment above mentioned are, with an exception which will hereinafter be particularly pointed out, substantially the same in construction and operation as the Westinghouse Air Brake Company's No. 8EL locomotive brake equipment fully disclosed in their instruction pamphlet No. 5032–1, sup. 3, dated July 1943, and also substantially the same in operation as the locomotive brake equipment fully disclosed in Patent No. 2,009,841, issued to Ellis E. Hewitt on July 30, 1935. Only such portions of the locomotive brake equipment are therefore disclosed in the drawings and only the portions of the operation of said equipment will therefore be described in this application which I consider essential to an understanding of the improvement provided by the invention.

The distributing valve device 1 comprises an equalizing portion 25, an application portion 26, a reduction chamber cut-off valve device 27, a release valve device 28, and a safety valve device 29 all of which parts are carried by a bracket 30, to which the above-mentioned pipes are also connected. Also carried by pipe bracket 30 is a controlled emergency valve device 31. The pipe bracket 30 in turn is carried by a reservoir portion in which there is provided a pressure chamber 32 and an application chamber 33, said pipe bracket containing a reduction chamber 34.

The application portion 26 of the distributing valve device comprises an application valve 35 controlling communication between a passage 36 extending through the bracket 30 and connected to the main reservoir pipe 6, and a chamber 37 which is open through a passage 38 extending through said bracket to the brake cylinder device 5. A slide valve 38a contained in chamber 37 controls communication between said chamber and an atmospheric port 39. The application portion further comprises an application piston 40 at one side of which is an application piston control chamber 41 open to a passage 42 in the bracket while at the opposite side is a chamber 43 open to valve chamber 37 through a choke 44 in passage 38. Projecting from piston 40 into chamber 37 is a stem 45 connected to the slide valve 38a with looseness and with the end of said stem arranged for contact with the application valve 35.

The operation of the application portion of the distributing valve device 26 is as follows. When fluid under pressure is supplied through passage 42 to the application piston chamber 41, the piston 40 will be actuated thereby to move the slide valve 38a to a position for closing communication between valve chamber 37 and the atmospheric port 39. Upon further movement the stem 45 will engage and unseat the application valve 35 whereupon fluid under pressure from the main reservoir 4 will be supplied to the valve chamber 37 and thence to the brake cylinder device 5 for applying the locomotive brakes. As fluid is thus supplied through passage 38 to the brake cylinder device, fluid from said passage will equalize into chamber 43 at the opposite side of the application piston. If the pressure of fluid supplied to the application piston chamber 41 is limited to some chosen degree, then when the pressure of fluid obtained in the brake cylinder device 5 and acting in chambers 43 and 37 at the opposite side of piston 40 becomes substantially equal to that in chamber 41, said piston will be moved in the direction of the left-hand relative to the slide valve 38a to permit closing of the application valve 35 by a spring 46 for thereby preventing further increase in pressure in valve chamber 37, the brake cylinder device 5 and in the application piston chamber 43 whereupon the piston 40 will cease movement in a lap position. When the pressure of fluid in the application piston chamber 41 is reduced, the opposing pressure of fluid in chambers 43 and 37 will move the piston 40 to the position in which it is shown in the drawing for thereby moving the slide valve 38a to a corresponding position for opening the valve chamber 37 to the atmospheric port 39 whereupon fluid under pressure will be released from the brake cylinder device 5 for effecting a release of the locomotive brakes.

The equalizing portion 25 of the distributing valve device is provided for controlling supply and release of fluid under pressure to and from the application piston chamber 41 and to this end comprises a piston 47 at one side of which is a chamber 48 open to the brake pipe 7 through a passage 49. At the opposite side of piston 47 is a chamber 50 open through a passage 51 to the pressure chamber 32 and containing a main slide valve 52 and an auxiliary slide valve 53 arranged to be operated by a stem 54 projecting into the valve chamber 50 from piston 47.

The piston 47 and slide valves 52 and 53 have the usual brake release position (Fig. 1a), service position (Fig. 5), service lap position and emergency position. In the release position of the equalizing piston 47 and connected slide valves, which they will assume when the brake pipe 7 is charged with fluid under pressure, a communication 55 is opened around said piston to permit charging of the pressure chamber 32 by flow of fluid under pressure from said brake pipe through the piston chamber 48 to the valve chamber 50 and thence through passage 51. Also in the release position of the main slide valve 52, a cavity 56 therein connects a passage 57 from the application chamber 33 to a passage 58. In the service position of the piston 47 and slide valves 52 and 53 a service port 59 is adapted to be opened past the end of the auxiliary slide valve 53 to valve chamber 50 and thereby the pressure chamber 32, and at the seat of said slide valve said port is adapted to register with a passage 60. Also in service position of the main slide valve 52, cavity 56 therein is adapted to maintain communication between passages 57 and 58. In the emergency position of piston 47 and slide valves 52 and 53, passage 57 is adapted to be lapped by a portion 61 of the main slide valve 52 for cutting off communication between the application chamber 33 and passage 58, while a port 62 in said slide valve is adapted to be open to passage 60.

The reduction chamber cut-off valve device 27 comprises a piston 63 at one side of which is a chamber 64 and at the opposite side a chamber 65 containing a slide valve 66 arranged for movement by and with said piston. Chamber 64 is connected by a passage 67 to the seat of the main slide valve 52 which in release position is adapted to connect said passage via port 68 in said slide valve to a passage 69. With the piston 63 and slide valve 66 of the reduction cut-off valve device 27 in the cut-off position in which they are shown in the drawing and which will be assumed when an application of fluid pressure brakes is in effect, passage 69 is open to the valve chamber 65, whereby upon movement of the slide valve 52 to its release position the chambers at opposite sides of the reduction cut-off valve piston 63 will be open to each other to permit a spring 70 to move said piston and slide valve to a normal, right hand position defined by contact between said piston and a shoulder 71 in the casing. In this normal position, passage 69 will be lapped by the slide valve 66 but a passage 72 will be open to valve chamber 65. When the main equalizing slide valve 52 is moved to service position in initiating an application of brakes and fluid under pressure is supplied to passage 60 such fluid will flow through a cavity 73 to a passage 74 and thence to the reduction chamber 34 and also from the latter passage through a cavity 75 in the main equalizing slide valve 52 to passage 72 leading to valve chamber 65. At this time the chamber 64 at the opposite side of the reduction cut-off valve piston 63 will be open to atmosphere through passage 67, a cavity 76 in the main equalizing slide valve 52 and an atmospheric port 77, due to which, the reduction cut-off valve piston 63 will move the slide valve 66 to its left hand position as soon as sufficient pressure of fluid is obtained in the valve chamber 65 and connected reduction chamber 34 to overcome the opposing force of spring 70 on piston 63 and will then remain in this position while the brakes are applied and until the main equalizing slide valve 52 is subsequently returned to its release position. Since the normal position of the reduction piston 63 and slide valve 66 are not pertinent to the present invention these parts are shown in the drawing in the position which they assume when an application of fluid pressure brakes on the locomotive is in effect.

When in effecting an application of brakes by movement of the equalizing piston 47 to either its service or emergency position, the fluid under pressure supplied from the pressure chamber 32 to passage 60 will flow therefrom through cavity 73 in the reduction cut-off valve device to passage 58 and thence through cavity 56 in the main slide valve 52 and passage 59 to the application chamber 33. In emergency position there will be no such flow of fluid from passage 58 through the main slide valve 52 to the application chamber 33 since passage 59 is lapped by the portion 61 of the slide valve 52.

Connected to a mounting face on the pipe bracket 30 for the controlled emergency valve device 31 is the passage 58, the passage 42 from the application piston chamber 41, the passage 59, the passage 36 from the main reservoir pipe 7 and a passage 78 connected to the controlled emergency pipe 10, the controlled emergency valve device 31 having passages adapted to register with these passages opening at said mounting face. However, interposed between the pipe bracket 30 and controlled emergency valve device 31 is a filling piece 79 constituting a part of the present invention, said filling piece having passages 81, 82 and 83 extending therethrough connecting passages 78, 36 and 59 in the bracket to the correspondingly numbered passages in the controlled emergency valve device. The filling piece also has a passage 84 extending therethrough connecting passage 58 in the bracket to the corresponding passage in the controlled emergency valve device. In the pipe bracket 30 the passage 58 is open through a branch containing a slow application choke 85 to the corresponding passage in the emergency valve device via a passage 86 through the filling piece 79.

The controlled emergency valve device comprises a piston 88 at one side of which is a chamber 89 open to bracket passage 78 and thence to the controlled emergency pipe 10. At the opposite side of piston 88 is a valve chamber 90 containing a slide valve 91 connected for movement by and with the piston 88, said valve chamber being open to bracket passage 36 and hence main reservoir pipe 6. When piston chamber 89 is vented, pressure of fluid in valve chamber 90 will move said piston and the slide valve 91 to a short train position in which these parts are shown in the drawing and in which position a cavity 92 in said slide valve establishes a communication between passages 58 and 42. When fluid under pressure is supplied to piston chamber 89, in a manner which will be later brought out, a spring 93 is adapted to move the piston 88 and slide valve 91 to a long train position defined by contact between said piston and a shoulder 94 in the casing. In this long train position communication is closed between passages 58 and 42 through cavity 92 but maintained through the slow application choke 85, while another cavity 95 in said slide valve connects passage 42 to passage 59 leading to the application chamber 33.

If the filler piece 79 were removed and the controlled emergency valve device 31 mounted directly on the pipe bracket 30 it will be noted that passage 42 in said device would be open directly to the application piston chamber passage 42 in bracket 30, the interposition of the filler piece 79 breaking this connection however and opening passage 42 in said bracket to an external pipe 96 and passage 42 in said device to an external pipe 97. It will however be seen that with the distributing valve device 1 as commonly employed, that is, without the filling piece 79, fluid under pressure supplied to passage 58 upon movement of the equalizing piston 47 and the connected slide valves to either their service or emergency position would flow directly through cavity 92 to bracket passage 42 and thence to the application piston chamber 41 in the short train position of the controlled emergency valve device 31, while in the long train position of said valve device such fluid would flow from passage 58 through choke 85 to the application passage 42 leading to the application piston chamber 41 and at the same time from the latter passage by way of cavity 95 to passage 59 leading to the application chamber.

From the above in connection with the usual distributing valve device, it will be seen that when the controlled emergency valve device 31 is in its short train position, in which it is shown in the drawing, and the equalizing piston 47 operates to move the connected slide valves to service position, fluid under pressure from the pressure chamber 32 would flow to the application piston chamber 41 by way of said controlled emergency valve device and also to the application chamber 33 by way of cavity 56 in the main equalizing slide valve 52, while upon an emergency reduction in brake pipe pressure the application chamber 33 will be disconnected at the main equalizing slide valve and hence the fluid pressure from the pressure chamber 32 would flow only to passage 58 and thence to the controlled emergency valve device. In the controlled emergency position of the control emergency valve device 31 fluid supplied to passage 58 in service position of the equalizing piston and slide valves would flow through choke 85 to passage 42 and thence to the application piston chamber 41 and also from said passage 42 by way of cavity 95 to the application chamber 33 as well as to the latter chamber by way of cavity 56 in the main equalizing slide valve, the choke 85 therefore having no effect upon the rate of build-up in pressure in application piston chamber 41 under this condition, due to the communication through cavity 56 in the main slide valve 52 by-passing the choke 85. However, with the equalizing piston 47 and connected slide valves in emergency position in which the portion 61 of the slide valve 52 laps passage 59 from the application chamber, all fluid supplied to the application piston chamber 41 and to the application chamber 33 by way of the controlled emergency valve device 31, in its long train position, would occur through the choke 85 in order to retard the build-up of pressure in the application piston chamber 41 under this condition.

The independent application pipe 8 is connected to a passage 98 in the pipe bracket 30 which passage is open through a normal brake release choke 99 to a passage 100 leading to the seat of slide valve 66 in the reduction cut-off valve device 27. In the normal position of slide valve 66 the passage 100 is adapted to be connected through a cavity 101 in said slide valve to passage 58 for releasing fluid under pressure from the application piston chamber 41 by way of said pipe. The passage 98 is also connected to a chamber 102 in the release valve device 28 which comprises a check valve 103 contained in a chamber 104 for normally closing communication between the latter chamber and chamber 102. Chamber 104 is open to passage 58 and contains a spring 105 for urging said valve to its closed position. The release valve device 28 further comprises a piston 106 at one side of which is a chamber 107 which is open to atmosphere through a port 108. At the opposite side of piston 106 is a chamber 109 which is open through a passage 110 to the independent release pipe 9. Projecting from piston 106 through chamber 107 is a stem 111 arranged for contact with the release valve 103 upon movement of piston 106 by pressure of fluid in chamber 109 for unseating said check valve.

The safety valve device 29 is provided for limiting to a chosen degree the pressure of fluid effective for applying the fluid pressure brakes and to this end is connected by way of a passage 112 to the seat of the main equalizing slide valve 52. In service position of the slide valve 52 the passage 112 is connected through a port 113 therein and a cavity 114 in auxiliary slide valve 53 to passage 68 and thereby cavity 56, the application chamber 33 and to passage 58 adapted to be open to the application piston chamber 41, while in emergency position of the slide valve 52 the passage 112 is adapted to be open to port 62 in the main slide valve 52 and thus to the pressure chamber 32 and application piston chamber 41 which will be connected therewith under this condition.

The automatic brake valve device 2 comprises a rotary valve 117 and a handle 118 for turning said rotary valve to its usual release, running, service, lap and emergency positions. As well known, in service position the rotary valve 117 is adapted to effect a service reduction in pressure in brake pipe 7 for effecting movement of the equalizing piston 47 and connected slide valves to their service position, while upon movement of said handle to emergency position, an emergency reduction in pressure is adapted to be effected in brake pipe 7 for moving said piston and slide valves to their emergency positions. The handle 118 is normally carried in its running position for charging the brake pipe 7 with fluid under pressure to effect movement of the equalizing piston 47 and connected slide valves to their brake release positions. These operations are so well known that a further description thereof is not essential in the present application. It is however desired to point out that in the running position of rotary valve 117 a cavity 119 therein is adapted to connect a passage 120 to an atmospheric port 121 while in the emergency position (Fig. 4), a port 122 in said rotary valve is adapted to establish communication between passage 120 and the rotary valve chamber 123 to permit flow of fluid under pressure from said chamber to said passage for the well known brake maintaining purposes.

The independent brake valve device 3 comprises a rotary valve 124 contained in a chamber 125 charged with fluid under pressure, as well known, and connected by a key 126 to an operating handle 127. The handle 127 and rotary valve 124 have a normal running position in which they are shown in Fig. 1 of the drawing, an independent brake application position (Fig. 3) and an independent brake release position (Fig. 2). The independent application pipe 8 and independent release pipe 9 are both connected to the seat of rotary valve 124 of the independent brake valve device and said rotary valve is provided with a cavity 128 for connecting said release pipe to an atmospheric passage 129 while a cavity 130 connects the application pipe 8 to the passage 120 leading to the automatic brake valve device 118 in the running position of said rotary valve. In the application position of the rotary valve 124, the release pipe 9 is open to the atmospheric port 129 through a cavity 131 in the rotary valve while the application pipe 8 is open to the rotary valve chamber 125 through a port 132 in the rotary valve whereby fluid under pressure may flow to said application pipe for effecting an independent application of brakes. In the release position (Fig. 2) of the rotary valve 124 the application pipe 8 is open to the atmospheric port 129 by way of a port 133 in the rotary valve while a port 134 therein connects the rotary valve chamber 125 to the release pipe 9.

Associated with the independent brake valve device is a controlled emergency cock comprising a handle 180 having a short train position, in which it is shown in the drawing, for opening the controlled emergency pipe 10 to atmosphere and also having a long train position, designated by a line 181 for supplying fluid under pressure to said pipe.

With the exception of the filler piece 79 associated with the distributing valve device 1, pipes 96 and 97 connected to said filler piece, the fluid pressure brake equipment so far described is identical to the well known 3EL brake equipment hereinbefore referred to and its operation is as follows, assuming the filler piece 79 to be removed and the controlled emergency valve device 31 to be mounted directly upon pipe bracket 30.

With the automatic brake valve handle 118 in its usual running position the brake pipe 7 will be charged with fluid under pressure and the equalizing piston 47 and connected slide valves in the distributing valve device will be in their release position and, as a result, the parts of the reduction cut-off valve device 27 will also be in their normal position, whereby the pressure chamber 32 will be charged with fluid at the pressure in the brake pipe and the application piston chamber 41 will be connected through the controlled emergency valve device 31 to passage 58 to which via cavity 56 in the main slide valve 52 passage 59 from the application chamber will also be connected. Passage 58 will be open to passage 100 through cavity 101 in the reduction cut-off valve device and thence to the independent application pipe 8 and through cavity 130 in the rotary valve 124 of the independent brake valve device 2 to passage 120 and thence to atmosphere through cavity 119 in the rotary valve 117 of the automatic brake valve device and the atmospheric port 121, whereby the brakes on the locomotive will be released.

Now assuming that by operation of the automatic brake valve device to service reduction, a service reduction in pressure is effected in brake pipe 7, the equalizing piston 47 and connected slide valves of the distributing valve device will assume their service position for opening the pressure chamber 32 through the service port 59 to passage 60, and thence after operation of the reduction cut-off valve device 28 to its cut-off position in which it is shown in the drawing, to passage 58 leading to the seat of the main equalizing slide valve 52 and also to the controlled emergency valve device 31. Assuming that the controlled emergency valve device is in its short train position, in which the parts are shown in the drawing, fluid from passage 58 will flow through cavity 92 to the application piston chamber 41, and at the same time that this occurs, fluid will also flow from passage 58 through cavity 56 to the main slide valve to the application chamber 33, whereby the brakes on the locomotive will be applied. If the controlled emergency valve device is in its long train position the same result will attain since at the same time that fluid is supplied to the application chamber 33 by way of cavity 56 in the main slide valve 52 fluid will be supplied to the application piston chamber 41 by way of choke 85 and through the controlled emergency valve device 31, as well as by passage 59 and through cavity 95 in the controlled emergency slide valve 92, the choke 85 being ineffective in effecting a service application of brakes due to the communication through cavity 95 in the controlled emergency valve device by-passing said choke.

If the brake valve 2 is operated to effect an emergency reduction in pressure of fluid in the brake pipe, the equalizing piston 47 and connected slide valves in the distributing valve device will move to emergency position for supplying fluid under pressure from the pressure chamber 32 only to the application piston chamber 41, if the controlled emergency valve device 31 is in short train positions or to both said chamber and to the application chamber 33 by way of the choke 85 in the controlled emergency valve device if the controlled emergency valve device is in its long train position.

If the automatic brake valve device is returned from either service or emergency position to running position fluid under pressure will be released from the application piston chamber 41 by way of cavity 130 in the rotary valve 124 in the brake valve device 3 in its running position and thence by way of cavity 119 in the rotary valve 117 of the automatic brake valve device and the atmospheric port 121, as before described.

If when the brake pipe 7 is charged and the equalizing piston 47 and connected slide valves are in their release position the operator desires to apply the locomotive brakes without reducing the pressure of fluid in said brake pipe, he may move his independent brake valve handle 127 from its running position to its application position (Fig. 3) for thereby supplying fluid under pressure to the application pipe 8. Fluid thus supplied to the independent application pipe 8 will flow to chamber 102 in the release valve device 28 and unseat the check valve 103 and then flow to passage 58 and through the controlled emergency valve device 31 to application piston chamber 41 for applying the locomotive brakes. At the same time as fluid is thus supplied past the check valve 103 fluid may also flow, without any effect upon the application however, from the passage 98 connected to the independent application release pipe 8 through the normal release choke 99, cavity 101 in the reduction cut-off valve device 27, in its normal position, to passage 58 along with a supply of fluid to said passage past the check valve 103.

In order to release an independent application of brakes thus effected the operator may return the independent brake valve handle 127 to its running position (Fig. 1) for opening the independent application pipe 8 through cavity 130 in the independent rotary valve 124 to passage 120 which is vented through the automatic brake valve device 2 whereupon fluid will be released from the application piston chamber 41 by reverse flow through normal release choke 99. If a faster rate of independent brake release is desired the brake valve handle 127 may be turned to its quick release position (Fig. 2) in which the independent application pipe 8 is open to atmosphere through cavity 133 and fluid under pressure is supplied to the independent release pipe 9. Fluid under pressure thus supplied to the release pipe 9 will flow to chamber 109 in the release valve device 28 and therein actuate piston 106 to unseat the check valve 103 whereupon fluid under pressure from the application piston chamber 41 will flow through passage 58 back to passage 98, by-passing the normal release choke 99, and thence to atmosphere through the independent application pipe 8 which is vented in the release position (Fig. 2) of the independent brake valve device.

If when the fluid pressure brakes on the locomotive are applied by either service or emergency operation of the equalizing piston 47 and connected slide valves, the operator desires to release the brakes on the locomotive independently of those on a connected train, he may move his independent brake valve handle 127 to its release position whereupon a release of the locomotive brakes will occur in the same manner as just described. If desired to reapply the fluid pressure brakes under the condition just mentioned he may move his independent brake valve handle 127 to its application position for supplying fluid under pressure to the application pipe 9 from whence it will flow past check valve 103 to the independent release valve device 28 to the application piston chamber 41 for reapplying the brakes.

In controlling the brakes by operation of the automatic brake valve device 2 it will be noted that when the equalizing piston 47 and connected slide valves are in either their service or emergency position for effecting application of brakes, the independent application pipe 8 is disconnected from the application piston chamber 41 by the closed check valve 103 in the release valve device 28 and by the slide valve 66 in the reduction chamber cut-off valve device 27. When the equalizing piston and slide valves are returned to their release position, the application piston chamber 41 is opened to the application pipe 8 by the return of the reduction cut-off valve device to its normal position. If the independent application pipe 8 were allowed to remain at atmospheric pressure while the brakes were applied, then upon return of the equalizing portion of the distributing valve to release position an undesired reduction in pressure in the application piston chamber 41 would occur due to equalization of such pressure into the application pipe and this would result in an uncontrolled degree of brake release. In order to prevent this in the usual No. 8EL locomotive brake equipment, fluid under pressure supplied to passage 38 for operating the brake cylinder device 5 has heretofore been allowed to flow past a check valve 135 to passage 98 and thence to the independent application pipe 8 in effecting an application of brakes. In accordance with another feature of the invention this supply of fluid under pressure to the application pipe when effecting an application of the fluid pressure brakes is done away with by the provision of a plug 136 disposed in the communication between the check valve 135 and passage 98, said plug and the filling piece 79 constituting essential additions to the No. 8EL equipment for interlocking operation thereof with dynamic brake equipment, as will now be described.

The pipe 96 connected to the filler piece 79 leads to the side outlet of a double check valve device 137 the opposite end outlets of which are connected respectively to pipes 138 and 139. The double check valve device 137 comprises a double check valve 140 operative upon supply of fluid under pressure to pipe 139 with pipe 138 vented to open pipe 139 to pipe 96 and to close communication from pipe 96 and pipe 138, and also operative upon supply of fluid under pressure to pipe 138 with pipe 139 vented to close communication between pipe 96 and pipe 139 and to connect pipe 138 to pipe 96. A spring 141 acts on the double check valve 140 for biasing it to the position for opening pipe 139 to pipe 96.

The pipe 138 is connected to a valve chamber 142 in an emergency device 143 comprising a valve 144 for closing communication between chamber 142 and a chamber 145 which latter chamber is open to the independent application pipe 8. The valve 144 is carried on the end of a stem 146 extending through the chamber 145 and connected to one end of a plunger 147 which is slidably mounted in a casing. The opposite end of plunger 147 is provided with a valve seat encircling a bore 148 extending through the plunger 147, stem 145, and valve 144 to chamber 142, said seat being provided for cooperation with a valve 149 contained in a chamber 150 which is open to atmosphere by way of a passage 151. The valve 149 is connected to one end of a stem 152 projecting from chamber 150 through a suitable bore in the casing into a chamber 153 which is open to atmosphere through a port 154. In chamber 153, the stem 152 is provided with a follower head 155 engaging one side of a flexible diaphragm 156. At the opposite side of diaphragm 156 is a chamber 157 open to the brake pipe 7. When the brake pipe 7 and the diaphragm chamber 157 are charged with fluid above a chosen pressure the diaphragm 156 will deflect against a spring 159 to seat the valve 149 and then actuate plunger 147 to open valve 144 for thereby connecting the independent application pipe 8 to pipe 138 leading to the one end of the double check valve 140. Upon an emergency reduction in pressure in brake pipe 7 and diaphragm chamber 157 the spring 159 is adapted to actuate said diaphragm to pull the valve 149 out of engagement with its seat on plunger 147 and to permit a spring 160 to close the valve 144 for thereby disconnecting the independent application pipe 8 from pipe 138 and for venting the latter pipe by way of passage 151.

The pipes 139 and 97 connect to a magnet valve device 161 which comprises a magnet diagrammatically shown as arranged in the dynamic brake circuit in series with the dynamic brake resistor 12 so as to be energized when the dynamic brakes are effective and deenergized at other times. The magnet valve device further comprises two oppositely seating valves 162 and 163 contained in a chamber 164 to which pipe 139 is connected. The valve 162 is arranged to control communication between chamber 164 and an atmospheric passage 165 while the valve 163 controls communication between chamber 164 and a chamber 166 to which pipe 97 is connected. Upon energization of the magnet valve device 161 the valve 163 is adapted to be closed and the valve 162 open for connecting pipe 139 to the atmospheric passage 165, while upon deenergization of said magnet valve device a spring 167 is adapted to open valve 163 and close valve 162 for thereby establishing communication between pipes 97 and 139.

Reference numeral 169 designates an emergency switch device for preventing operation of the dynamic brakes upon an emergency reduction in pressure in the brake pipe 7 and to this end comprises a movable contact 170 arranged to open and close the dynamic brake circuit and connected by a stem to a piston 171 at one side of which is a chamber 172 open to the brake pipe 7. When the brake pipe 7 is charged with fluid under pressure the piston 171 is adapted to actuate the switch 170 to a closed position while upon release of fluid under pressure from chamber 172 upon an emergency reduction in pressure in brake pipe 7, a spring 173 is adapted to actuate said piston to withdraw the movable contact 170 to a circuit opening position.

It will be noted that the magnet valve device 161 controls communication between passages 58 and 42 in the distributing valve device and when deenergized opens such communication by way of pipe 97, pipe 139, the double check valve device 137 and pipe 96 so as to permit pressure of fluid in the application piston chamber 41 to be controlled by operation of the equalizing portion 25 of the distributing valve device in the usual manner. When the dynamic brakes are effective and the magnet valve device 161 is consequently energized this communication is closed by the seating of valve 163 so as to prevent supply of fluid under pressure to the application piston chamber 41 in case the equalizing valve device 25 is operated in response to a reduction in brake pipe pressure for thereby preventing an application of fluid pressure brakes on the locomotive. In case the fluid pressure brakes on the locomotive are applied by pressure of fluid in the application piston chamber 41 at the time the dynamic brakes are cut into action, energization of the magnet valve device 161 and consequent opening of valve 162 will release the fluid under pressure from the application piston chamber 41 by way of passage 42, pipe 96, past the upper end of the double check valve 140, through pipe 139 and thence past said open valve, assuming that pipe 138 at this time is vented with the independent brake valve handle 127 in its running position. Thus normally both the fluid pressure brakes and the dynamic brakes cannot be effective together, operation of the dynamic brakes preventing application of the fluid pressure brakes or releasing such an application of the fluid pressure brakes if effective. Upon an emergency reduction in pressure in the brake pipe 7, the switch device 169 will however operate to cut out the dynamic brakes, if effective, or to prevent operation of the dynamic brakes and the locomotive will be braked solely by the fluid pressure brakes.

While the dynamic brakes are effective and the magnet valve device 161 is consequently energized and venting pipe 97, if it is desired to also brake the locomotive by the fluid pressure brakes thereon such may be accomplished however by operating the independent brake valve device 3 to its application position (Fig. 3) for thereby supplying fluid under pressure to the independent application pipe 8. The emergency device 143, with the brake pipe 7 charged, connects the independent application pipe 8 to pipe 138 so that fluid pressure supplied to the former pipe will flow to the latter and then past the double check valve 140 to pipe 96 and the application piston chamber 41 for thereby actuating the application portion 40 of the distributing valve device to the locomotive brakes, regardless of whether the equalizing portion 25 of the distributing valve device is in its release position or its service position. In order to release an independent application of the brakes effected as just described, while the dynamic brakes are effective, the independent brake valve handle 127 may be returned to its running position (Fig. 1) for opening the independent application pipe 8 to atmosphere by way of cavity 119 of rotary valve 117 of the automatic brake valve device 2 and the atmospheric port 121 whereby the fluid under pressure will be released from the application piston chamber 41 by way of the double check valve 137 and the emergency device 143 until the pressure of fluid in pipe 138 acting on one end of the double check valve 140 is reduced to a degree where spring 141 will shift said valve to its lower position whereupon the further and final release of fluid under pressure from the application piston chamber 41 will occur past the upper end of double check valve 140 and then through pipe 139 past the unseated valve 162 in the energized magnet valve device 161 and through the atmospheric port 165. If the automatic brake valve device 2 should be in service or lap position at the time a release of an independent application of brakes is desired, such may be obtained by moving the independent brake valve device to its release position (Fig. 2) for actuating the release valve device 28 to vent the application chamber 40 via of the application pipe 8, as previously described.

It will thus be seen that regardless of the position of the equalizing portion 25 of the distributing valve device at the time the dynamic brakes are effective, the fluid pressure brakes on the locomotive may be independently applied and released, if desired, by usual operation of the independent brake valve device 3.

When the automatic brake device is moved to its emergency position for effecting an emergency application of brakes, fluid from the rotary valve chamber 123 therein is supplied through port 122 to passage 120 and thence through cavity 130 in the rotary valve 124 of the independent brake valve device 3 to the independent application pipe 8 for maintaining the pressure of fluid in the application piston chamber 41 at the adjustment of the safety valve device 29 against leakage, as well known.

When the controlled emergency valve device 31 is in its lower position for retarding the rate of brake application on the locomotive it is desirable that this supply of fluid from the automatic brake valve device 2 in emergency position to the application piston chamber 41 be controlled by the slow application choke 85 disposed in the pipe bracket 1 adjacent the filler piece 79 and to obtain this result the emergency device 143 is adapted to operate in emergency to close communication between the application pipe 9 and the pipe 138 whereby this supply of fluid from the automatic brake valve device will have to flow through passage 98 in the distributing valve device to chamber 102 in the release portion 28 thereof and thence past the check valve 103 to passage 58 to which the pressure chamber 32 is also open in emergency position of the equalizing portion 25 of the distributing valve device, whereby the supply of fluid from the automatic brake valve device, as well as from the pressure chamber 32, to passage 58 will have to flow through the controlled emergency choke 85 to the application chamber 33 and to pipe 96 and from said pipe to pipe 97 leading to the application piston chamber 41, whereby the rate of brake application under this condition will be the same as heretofore.

On certain multiple unit diesel locomotives each of the units is provided with a distributing valve device 1 and in order that same will operate in unison with the distributing valve device on the lead unit the brake pipe 7, the main reservoir pipe 6, the independent application pipe 8 and the independent release pipe 9 extends through the full length of the locomotive for connection with the distributing valve device on each of the trailing units. On certain locomotives the controlled emergency pipe 10 may also extend through the several units in which case the filler piece 79 will be provided on each unit between the distributing valve device 1 and controlled emergency portion 31 thereof to provide the desired interlock above described between the fluid pressure and dynamic brake equipments thereon.

On certain diesel locomotives, however, the controlled emergency pipe 10 is provided only on the lead locomotive in which case it has been customary to provide on each of the trailing units a filler piece 174 (Fig.6) between the distributing valve pipe bracket 30 and controlled emergency valve device 31. This filler piece is provided with passages for connecting the various passages opening to the mounting face of the distributing valve device bracket 30 to the corresponding passages in the controlled emergency valve device 31 and in addition is provided with a valve 175 arranged to be operated by a handle 176 to either a controlled emergency or long train position in which said handle and valve are shown in the drawing or to a non-control or short train position indicated by dotted line 177. With this arrangement passage 78 in the bracket 30, connected on the lead locomotive to the controlled emergency pipe 10, is closed by a plug 177 on the trailer unit or units to which the filler piece 174 is applied. In the controlled emergency position of the valve 175 communication is established between passage 36, supplied with fluid under pressure from the main reservoir pipe 6, and passage 78 open to the piston chamber 89 in the controlled emergency valve device 31 whereby the piston 88 and slide valve 91 in said device will assume their lower, controlled emergency position. In the non-control position of the valve 175, passage 78 is open to atmosphere through a passage 178 for venting piston chamber 89 in the controlled emergency valve device 31 so that the parts of said device will assume their non-controlled position. The selector valve device 175 on the trailer unit of the locomotive therefor performs the same function as the selector cock controlled by handle 189 associated with the independent brake valve device 3 on the lead locomotive performs in connection with the controlled emergency valve device on the lead locomotive.

In accordance with the invention the filler piece 79 may be inserted between the filler piece 174 and the controlled emergency portion 31 on the trailing unit or units of a locomotive on which the controlled emergency pipe 10 is not present and the fluid pressure brakes on the trailing unit or units will then be controlled in correspondence with the fluid pressure brakes on the leading unit as it is believed will be apparent from the above description.

*Summary*

It will now be seen that I have provided an interlock arrangement for use between fluid pressure and dynamic brake systems for a locomotive which under usual conditions will prevent both of the brake systems being effective at the same time. Operation of the dynamic brake system will prevent a normal service application of the fluid pressure brakes or, if such an application is in effect, it will be released when the dynamic brakes are brought into operation. If necessary, however, the fluid pressure brakes on the locomotive may be applied or released by usual operation of the independent brake valve device while the dynamic brakes are in effect. In case however of an emergency reduction in brake pipe pressure for effecting an emergency application of the fluid pressure brakes on the locomotive operation of dynamic brakes will be prevented or if the dynamic brakes are effective they will be rendered ineffective under such a condition.

Having now described the invention, what I claim as new and desire to secure by Letters Patent, is:

1. In a locomotive brake equipment, in combination, a brake pipe, brake application means operative by fluid under pressure to effect an application of brakes, valve means responsive to a reduction in pressure of fluid in said brake pipe to supply fluid under pressure for operating said application means, control means controlling flow of fluid under pressure from said valve means to said application means and selectively operative to provide different rates of such flow, electric brake means, and means controlled by and operative when said electric brake means is effective to close communication between said control means and application means and to release fluid under pressure from said application means and when ineffective to open said communication.

2. In a locomotive brake equipment, in combination, a brake pipe, brake application means operative by fluid under pressure to effect an application of brakes, valve means responsive to a reduction in pressure of fluid in said brake pipe to supply fluid under pressure for operating said application means, control means controlling flow of fluid under pressure from said valve means to said application means and selectively operative to provide different rates of such flow, electric brake means, means controlled by and operative when said electric brake means is effective to close communication between said control means and application means and to release fluid under pressure from said application means and when ineffective to open said communication, an independent brake application pipe, and means responsive to supply of fluid under pressure to said independent brake application pipe, to establish a communication from said application pipe to said application means by passing said communication.

3. In a locomotive brake equipment, in combination, a brake pipe, brake application means operative by fluid under pressure to effect an application of brakes, valve means responsive to a reduction in pressure of fluid in said brake pipe to supply fluid under pressure for operating said application means, control means controlling flow of fluid under pressure from said valve means to said application means and selectively operative to provide different rates of such flow, an independent brake application pipe, means controlling the fluid pressure communication between said control means and said application means comprising a double check valve for selectively opening said application means to either said control means or to said independent brake application pipe, which ever is supplied with fluid at greater pressure, electric brake means, means controlling communication between said control means and double check valve device responsive to braking operation of said electric brake means to close such communication and to open to atmosphere the respective connection to said double check valve device and operative upon rendering said electric brake means ineffective to open the last named communication.

4. In a locomotive brake equipment, in combination, a brake pipe, a distributing valve device comprising a pipe bracket, application means carried by said bracket operative in response to pressure of fluid in one passage therein to effect an application of brakes, equalizing means carried by said bracket operative upon a reduction in pressure of fluid in said brake pipe to supply fluid under pressure to a second passage in said bracket, controlled emergency means, a filler piece carried by said bracket carrying said controlled emergency means, two pipes connected to said filler piece, a passageway in said filler piece connecting said one passage to one of said two pipes, another passageway in said filler piece connecting said second passage to said controlled emergency means, a third passage in said filler piece connecting the other of said two pipes to said controlled emergency means, said controlled emergency means comprising means selectively operative to provide different rates of flow of fluid under pressure from said second passage to said third passage and thence to said other pipe, an independent brake application pipe, a double check valve for selectively opening said one pipe to either said independent brake application pipe or to a third pipe which ever is supplied with fluid at higher pressure, electric braking means, and means operative upon rendering said electric braking means effective to open said other pipe to said third pipe and when ineffective to close communication between said one pipe and third pipe and to vent said third pipe.

5. In a locomotive brake equipment, in combination, a brake pipe, a distributing valve device comprising a pipe bracket, application means carried by said bracket operative in response to pressure of fluid in one passage therein to effect an application of brakes, equalizing means carried by said bracket operative upon a reduction in pressure of fluid in said brake pipe to supply fluid under pressure to a second passage in said bracket, controlled emergency means a filler piece carried by said bracket carrying said controlled emergency means, two pipes connected to said filler piece, a passageway in said filler piece connecting said one passage to one of said two pipes, another passageway in said filler piece connecting said second passage to said controlled emergency means, a third passage in said filler piece connecting the other of said two pipes to said controlled emergency means, said controlled emergency means comprising means selectively operative to provide different rates of flow of fluid under pressure from said second passage to said third passage and thence to said other pipe, an independent brake application pipe, a double check valve for selectively opening said one pipe to either said independent brake application pipe or to a third pipe whichever is supplied with fluid at higher pressure, an independent brake valve device for supplying fluid under pressure to and releasing fluid under pressure from said independent brake application pipe, said distributing valve device further comprising means providing for flow of fluid under pressure from said independent brake application pipe to said second passage and a check valve for preventing reverse flow of such fluid under pressure to said independent application pipe, an engineer's automatic brake valve device having an emergency position and comprising means for in said emergency position supplying fluid under pressure to said independent application pipe, and valve means operable by pressure of fluid in said brake pipe to open communication between said independent application pipe and said double check valve device and upon an emergency reduction in brake pipe pressure to close such communication.

6. A locomotive brake equipment comprising, in combination, a distributing valve device comprising a reservoir portion having a normally charged pressure chamber and normally vented application chamber, a pipe bracket connected to said reservoir portion, application means carried by said bracket operative in response to supply of fluid under pressure to a first passage in said bracket to effect an application of brakes, a brake pipe, equalizing means carried by said bracket operative upon a service reduction in pressure of fluid in said brake pipe to open said pressure chamber to a second passage in said bracket and also to said application chamber and operative upon an emergency reduction in brake pipe pressure to open said pressure chamber to said second passage but not to said application chamber, an application chamber passage in said bracket connected to gency pipe passage in said bracket, all of said passages opening at a mounting face on said bracket, a controlled emergency device having passages for registry with said passages at said mounting face, a filler piece mounted on said mounting face carrying said controlled emergency device and having passages connecting said second passage, said application chamber passage and said controlled emergency pipe passage to said controlled emergency means, said controlled emergency means comprising means operative upon supply of fluid under pressure to said controlled emergency pipe passage to a position for establishing a restricted communication from said second passage to said application chamber passage and to a passageway in said filler piece and operative upon venting of said controlled emergency pipe passage to another position for establishing a communication of greater flow capacity from said second passage to said passageway and for closing communication between said second passage and said application chamber passage, control means for selectively supplying fluid under pressure to and for venting fluid under pressure from said controlled emergency pipe passage, another passageway in said filler piece open to said first passage in said bracket, two pipes connected to said filler piece one to said one passageway therein and the other to said other passageway, electric brake means, means operative upon rendering said electric brake means effective to close communication between said two pipes and to vent the one of said two pipes which is open to said other passageway and operative upon rending said electric brake means ineffective to open communication between said two pipes.

7. A locomotive brake equipment comprising, in combination, a distributing valve device comprising a reservoir portion having a normally charged pressure chamber and normally vented application chamber, a pipe bracket connected to said reservoir portion, application means carried by said bracket operative in response to supply of fluid under pressure to a first passage in said bracket to effect an application of brakes, a brake pipe, equalizing means carried by said bracket operative upon a service reduction in pressure of fluid in said brake pipe to open said pressure chamber to a second passage in said bracket and also to said application chamber and operative upon an emergency reduction in brake pipe pressure to open said pressure chamber to said second passage but not to said application chamber, an application chamber passage in said bracket connected to said application chamber, a controlled emergency pipe passage in said bracket, all of said passages opening at a mounting face on said bracket, a controlled emergency device having passages for registry with said passages at said mounting face, a filler piece mounted on said mounting face carrying said controlled emergency device and having passages connecting said second passage, said application chamber passage and said controlled emergency pipe passage to said controlled emergency means, said controlled emergency means comprising means operative upon supply of fluid under pressure to said controlled emergency pipe passage to a position for establishing a restricted communication from said second passage to said application chamber passage and to a passageway in said filler piece and operative upon venting of said controlled emergency pipe passage to another position for establishing a communication of greater flow capacity from said second passage to said passageway and for closing communication between said second passage and said application chamber passage, another filler piece interposed between said mounting face and said controlled emergency means having passages connecting said second passage, said application chamber passage and said controlled emergency pipe passage in said bracket to the corresponding passages in the first named filler piece, another passageway in the first named filler piece open through said other filler piece to said first passage in said bracket, a fluid pressure supply passage in said bracket open to a corresponding passage in said other filler piece, valve means in said other filler piece for either opening said controlled emergency pipe passage therein to atmosphere or to said fluid pressure supply passages therein, two pipes connected to the first named filler piece, one to said one passageway and the other to the other passageway, electric brake means, means operative upon rendering said electric brake means effective to close ccommunication between said two pipes and to vent the one of said two pipes which is open to said other passageway and operative upon rendering said electric brake means ineffective to open communication between said two pipes.

WILBUR M. LEWIS.

REFERENCES CITED

The following references are of record in the file of this patent:

UNITED STATES PATENTS

| Number | Name | Date |
| --- | --- | --- |
| 1,621,403 | Hamilton | Mar. 15, 1927 |
| 2,445,680 | Linhart | July 20, 1948 |